(12) United States Patent
Frey

(10) Patent No.: US 6,315,314 B1
(45) Date of Patent: Nov. 13, 2001

(54) FRAME STRUCTURE FOR A DOUBLE-AXLE POLYCYCLE FOR SEVERAL OCCUPANTS

(76) Inventor: Rudolf Frey, Muhlebachstrasse 139, CH-8008 Zurich (CH)

( * ) Notice: Subject to any disclaimer, the term of this patent is extended or adjusted under 35 U.S.C. 154(b) by 0 days.

(21) Appl. No.: 09/171,282
(22) PCT Filed: Feb. 16, 1998
(86) PCT No.: PCT/CH98/00059
  § 371 Date: Apr. 29, 1999
  § 102(e) Date: Apr. 29, 1999
(87) PCT Pub. No.: WO98/35871
  PCT Pub. Date: Aug. 20, 1998

(30) Foreign Application Priority Data

Feb. 17, 1997 (CH) .......................................... 346/97

(51) Int. Cl.⁷ .................................................. B62K 5/00
(52) U.S. Cl. ...................................................... 280/282
(58) Field of Search .............................. 280/281.1, 282, 280/283, 288.1, 209

(56) References Cited

U.S. PATENT DOCUMENTS

| | | | |
|---|---|---|---|
| 264,073 | * | 9/1882 | Gallup ............................. 280/282 X |
| 728,811 | * | 5/1903 | Scott ................................ 280/282 |
| 3,516,686 | * | 6/1970 | Stalder ............................ 280/209 |
| 3,664,684 | * | 5/1972 | Long .............................. 280/282 X |
| 4,749,207 | * | 6/1988 | Oh ................................. 280/282 X |
| 4,799,704 | * | 1/1989 | Colarusso ...................... 280/282 X |
| 5,326,121 | * | 7/1994 | Fisher ............................. 280/282 |

FOREIGN PATENT DOCUMENTS

| | | | |
|---|---|---|---|
| 9210687 | 11/1992 | (DE) . | |
| 29610421 | 10/1996 | (DE) . | |
| 2281265 | 3/1976 | (FR) . | |
| 15630 | * 7/1898 | (GB) | ................................. 280/209 |
| 1395858 | * 5/1975 | (GB) | ................................. 280/209 |
| 4571 | * 3/1888 | (GB) | ................................. 280/282 |
| 9002823 | 7/1992 | (NL) . | |

* cited by examiner

Primary Examiner—Eric Culbreth
Assistant Examiner—F. Zeender
(74) Attorney, Agent, or Firm—Edwin D. Schindler

(57) ABSTRACT

The frame structure has two adjacent bent pipes (1, 2) which extend in the longitudinal direction of the vehicle and are inclined towards each other. In the illustrated side view, only the bent pipe (1) on the left side of the vehicle can be seen. This bent pipe (1) has a shape similar to that of a bowsaw. The idea underlying the invention is that the weight of the vehicle occupants acts on the bent pipe structure and is deflected into forces which push the two ends (4; 6) of the pipe away from each other. These deflected forces are in turn absorbed by pipes (10, 11) arranged in the longitudinal direction of the vehicle and which indirectly interconnect the ends of the bent pipes (1, 2) absorbing the traction forces therebetween. The two bent pipes (1, 2) are inclined towards each other and thus form a gable, seen in the longitudinal direction. The forces exercised downwards by the weight of the drivers upon this structure are thus deflected not only into traction forces acting between the front and rear ends (4, 5; 6, 7) of the bent pipes, but also into traction forces acting between the two front ends (4, 5) and the two rear ends (6, 7) of each bent pipe.

10 Claims, 3 Drawing Sheets

FRAME STRUCTURE FOR A DOUBLE-AXLE POLYCYCLE FOR SEVERAL OCCUPANTS

BACKGROUND OF THE INVENTION

Figure 1:
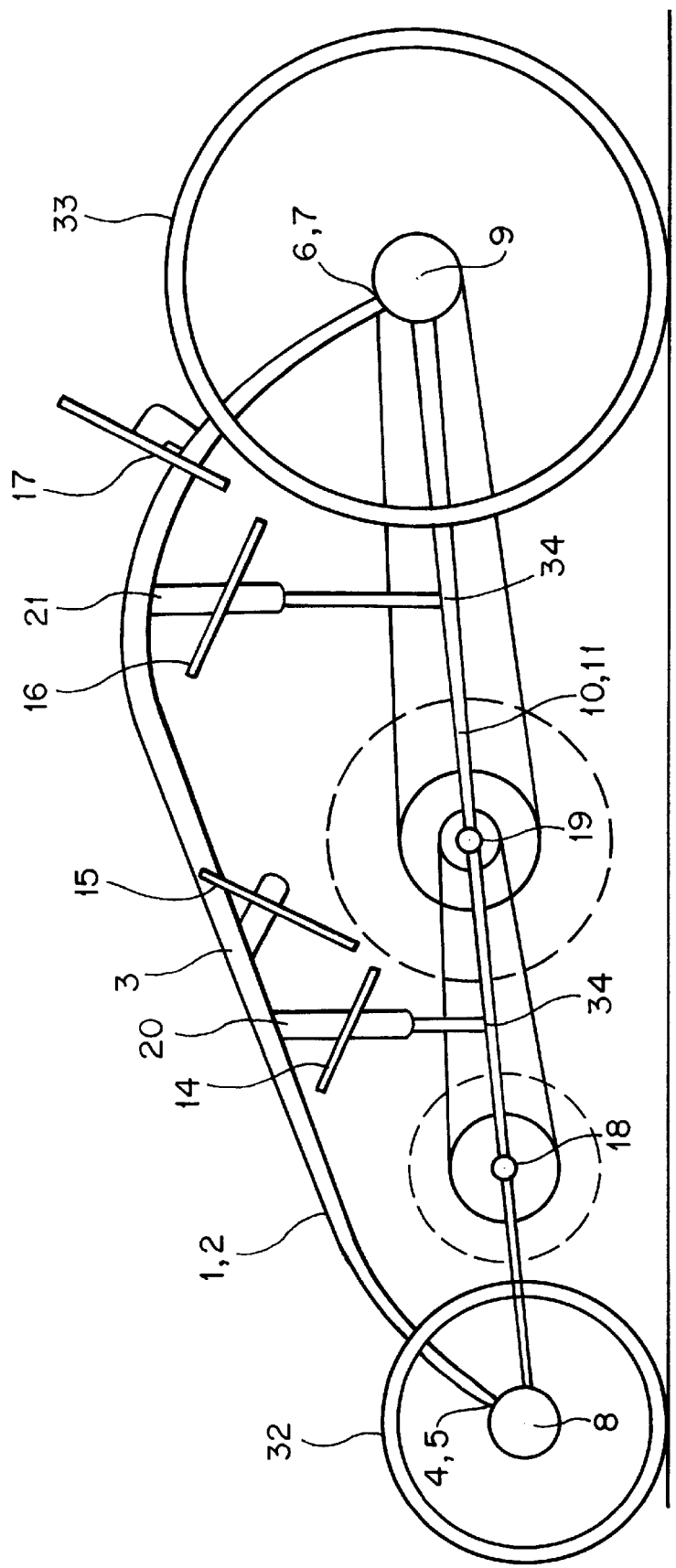

This invention relates to a frame structure for a double-axle polycycle for several occupants. Double-axle polycycles for several occupants already exist. Three-wheeled rickshaw vehicles, which are used as bicycle taxis, are familiar objects. A rickshaw can transport two passengers, but the driver has to pedal all on his own. Rickshaws have a strong frame structure, are correspondingly heavy, and can therefore only be used on flat terrain. Fully occupied, it is virtually impossible to negotiate slopes. Three-wheeled bicycles for one person also exist. Essentially, they are traditional bicycles which have an axle with two wheels at the back so that elderly or physically handicapped persons can travel by bicycle too, without needing to keep their balance. A three-wheeled tricycle pedalled by one person only is relatively heavy, however, because an extra wheel and an extra frame structure add a lot to the overall weight of the vehicle. Bicycles also exist for transporting and selling goods such as e.g. ice-cream, drinks and snacks, which have a front carriage with two wheels arranged parallel to each other on one axle, between which there is enough room for a container or a loading space. The entire front carriage is articulatedly connected with the rear part of the frame around the vertical axis, said rear part being essentially the same as the rear part of a conventional bicycle. Four-wheeled polycycles for two persons also exist. These mostly consist of two conventional bicycles arranged in parallel and welded together to form a vehicle frame by means of special transverse struts. Furthermore, the two front wheels are mounted on a parallelogram to take account of the fact that the inner cornering radius is smaller than the outer one. Bicycles of this type are often used as beach bicycles or fun bicycles, but are hardly suitable for covering distances of any length. This is because they do not have any special frame structure, but are merely two frames connected to each other so that each driver has to move more weight than he would have to if each driver had only his own bicycle to move. Beach bicycles that are more like pedal cars, with it heavy chassis structures also exist. The attraction of these pedal-mobiles lies in the originality of the experience that can be had by renting a pedal vehicle of this type. And because these vehicles are generally intended to be hired out, they have a correspondingly tough, heavy structure, so as to be durable. They are not, however, designed to be efficient from a biomechanical point of view, and can hardly he considered an efficient means of transport.

SUMMARY OF THE INVENTION

The task of this invention is to create a frame structure for a double-axle polycycle for several occupants which is characterized by high biomechanical efficiency when in operation. The structure is to be as simple and light as possible, and allow such a polycycle to be constructed for at least two persons, but preferably for four. The model for four persons is, in particular, conceived as a structure for a family of four, i.e. for two adults and two children. Accordingly, in this case, two of the four seats can be designed for smaller physiques. The aim is to create a frame structure that can be used to construct a polycycle which can accommodate up to four persons for day trips, or even for a holiday of several days.

This task is solved by a frame structure for a double-axle polycycle for several occupants with two adjacent bent pipes which extend in the longitudinal direction of the vehicle and are inclined towards each other, which are joined together along a section of the bent pipe structure, and whose ends are braced against each other in respect of traction.

An example of an embodiment of this frame structure will be illustrated with reference to the drawings and presented in detail in the following description, and its construction will be explained.

BRIEF DESCRIPTION OF THE DRAWING FIGURES

Figure 2:
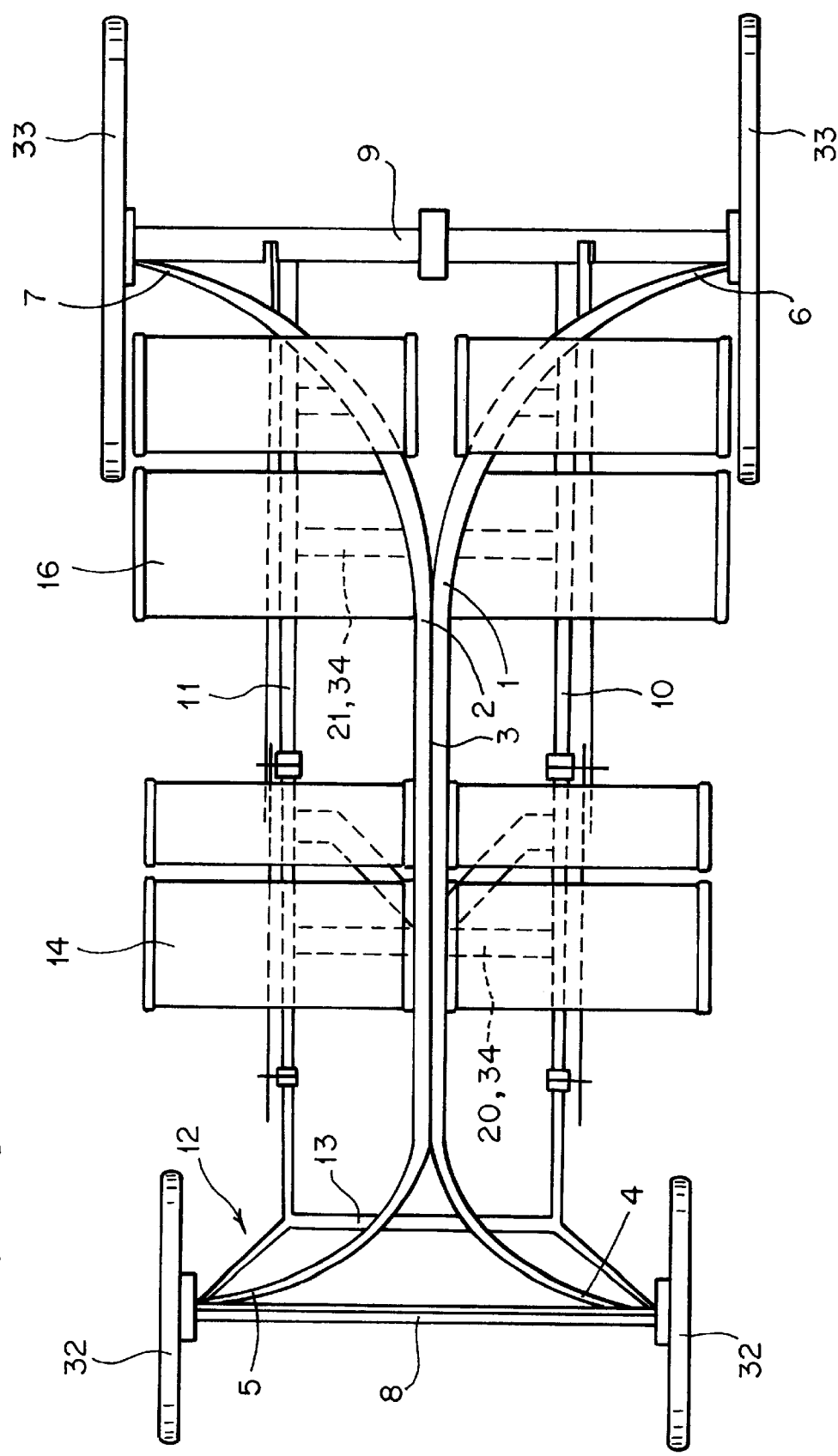
Figure 3:
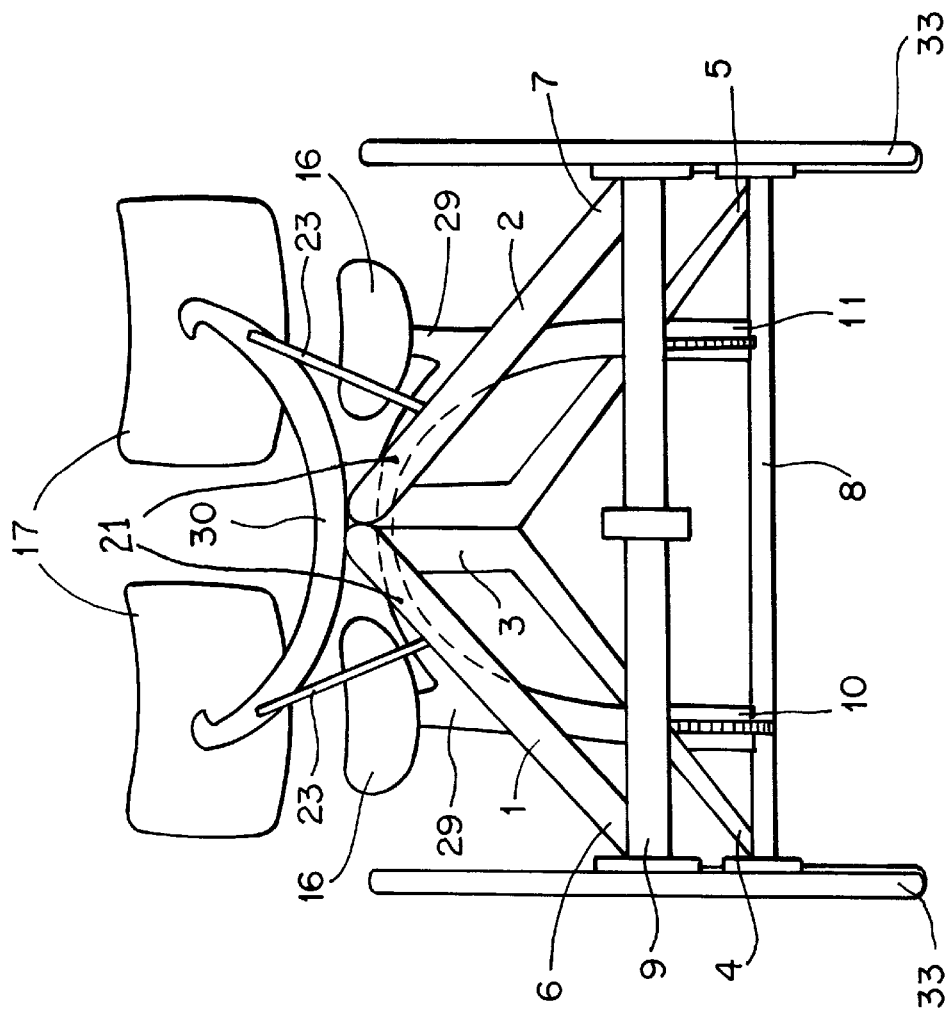

The drawings show:

FIG. 1: A side view of the frame structure,

FIG. 2: A top plan view of the frame structure;

FIG. 3: The frame structure seen from the rear.

DETAILED DESCRIPTION OF THE DRAWING AND PREFERRED EMBODIMENTS

FIG. 1 shows the frame structure seen from the side. It has two adjacent bent pipes 1, 2 which extend in the longitudinal direction of the vehicle and are inclined towards each other. In the side view shown here, only bent pipe 1 on the left side of the vehicle is visible. This bent pipe 1 has a shape similar to that of a bowsaw. The idea underlying the invention is that the weight of the persons sitting on the vehicle acts on the bent pipe structure and is deflected into forces which push the two ends 4; 6 of the bent pipe away from each other. These deflected forces are in turn absorbed by pipes 10, 11 arranged in the longitudinal direction of the vehicle which indirectly connect the ends of bent pipes 1, 2 to absorb the traction forces acting there-between. In the example shown here, the front end 4 joins up with the front axle 8, and the rear end 6 joins up with the rear axle 9. The wheels 33 connected to the rear axle are larger than the front wheels 32. Furthermore, the radius of the bend of the rear bent part is bigger here than that of the front bent part so that the overall bow-shaped frame structure is inclined slightly forwards. Bent pipe 1 is straight along one section 3. It is connected along this straight section 3 with the corresponding straight section 3 of the adjacent pipe 2, which is not visible here. In this example of an embodiment, seats 14, 16 and corresponding backrests 15, 17 are also mounted on the bent pipe structure. The front seats 14 are positioned lower down than rear seats 16 because of the inclined position of bent pipe structure 1, 2, its shape and the unequally sized wheels 32, 33, but they can also accommodate adults. They can, however, be designed for persons with smaller physiques as well, namely for children. In this case, the adults or parents of the children sit behind, allowing them to keep an eye on the children throughout the trip. Front and rear seats 14, 16 are secured to both longitudinally extending bent pipes 1, 2 and longitudinally extending pipes 10, 11 by means of additional struts 20, 21. In addition to absorbing the traction forces acting on bent pipe ends 4, 6 because of the weight of the drivers, pipe 10 extending in the longitudinal direction also accommodates the bottom bracket bearings 18, 19 with the cranks, and hence absorbs the reaction forces which occur when the cranks are pedalled. In the example shown, the crank circle described by the front pedal cranks is smaller than that of the back pedal cranks. This is a feature designed for persons of small physiques who sit at the front. In an embodiment for four persons of approximately the same size, the crank circles are identical. The sitting positions which this frame structure allows tend in the direction of a bicycle where the occupants are reclined. In this case, the reaction forces which occur when pedalling are too great to he fully absorbed by body weight alone, as is the case with conventional bicycles, and they are partly absorbed by backrests 15, 17 of seats 14, 16. Thanks to this fact it was also possible to arrange the steering device so that it does not have to absorb any counterforces, as is the case with conventional bicycles. Hence the pivoting front wheels 32 can be steered by a rod which is simply operated via a central steering element, which can be mounted on the straight section 3 of the two bent pipes 1, 2, comfortably positioned so that it can be gripped and held by one of the persons in the rear seats.

FIG. 2 shows the same structure from above. The two bent pipes 1, 2 are inclined towards each other, and thus form a gable, seen in the longitudinal direction. The forces exercised downwards by the weight of the drivers upon this structure are thus deflected not only into traction forces acting between the front and rear ends 4, 5; 6, 7 of the bent pipes as already described, but also into traction forces acting between the two front ends 4, 5 and the two rear ends 6, 7 of the bent pipes. These ends 4, 5; 6, 7 join up here directly with the front axle 8, and the rear axle 9. Accordingly, these axles 8, 9 absorb the traction forces acting between the two front ends 4, 5 and the two rear ends 6, 7 of bent pipes 1, 2. The traction forces between the front and rear axles 8, 9 are in turn absorbed as already described by the two straight pipes 10, 11 which extend in the longitudinal direction. To the rear these pipes 10, 11 join up directly with the rear axle 9, while at the front they join up with the ends of the shorter side 13 of a trapezium 12, which lies in the same plane as the two pipes 10, 11 and whose longer trapezium side is formed by front axle 8. The seats 14, 16 can be fixed to bent pipe structures 20, 21 of their own which extend crosswise to the longitudinal direction of the vehicle. The corresponding bent pipe structure 20, 21 proceeds from one of the two straight pipes 10, runs through underneath the two longitudinal bent pipes 1, 2 and down again to the adjacent straight pipe 11. It, in turn, can have a connecting piece 34 at its two bottom ends to absorb the traction forces acting between its two ends, with this connecting piece being a stiff pipe or a steel wire, which is even better for weight reasons.

FIG. 3 shows the frame structure in a view from the rear. The individual seats, which are shown here as rear seats 16 by way of example, are carried by cross-struts 21, on which they are adjustably mounted, for which purpose e.g. saddle pipes 29 can be welded onto cross-struts 21 on both sides. The associated backrests 17 are attached to brackets 30, which in turn are secured directly to longitudinal bent pipes 1, 2 and can each have a sloping brace 23 extending downwards to another point on the corresponding longitudinal bent pipe 1, 2 so as the deflect the reaction forces acting on backrests 17 to the corresponding bent pipes 1, 2.

The weight of this frame structure is very low compared with the weight of the persons to be transported, and it is certainly substantially less than the weight of four bicycles. In addition, the seating position is substantially lower than that of a bicycle and hence the center of gravity of the whole vehicle is lower, too. In the case of conventional three-wheeled vehicles, it is precisely the high center of gravity that is the cause of some danger when negotiating coiners. Here, however, one has virtually two reclined seat bicycles attached adjacent to each other with the two frames of both bicycles being secured together to form an intelligent frame structure, thereby saying a substantial amount of weight while ensuring sufficient stability. Optimum biomechanical conditions are achieved as a result of the light weight, the low friction losses of just four wheels for four persons, and the low, comfortable sitting position for pedalling. Because of the seating positions with two people behind two others, all seated low down, the resultant frontal area is small, which is very positive in respect of the aerodynamic resistance which has to be overcome. The frontal area is much smaller than e.g. that created by four conventional bicycles. Hence the frame structure makes it possible to achieve excellent biomechanical efficiency. In the case of a 4-person family, for example, the range of action is enlarged because, amongst other things, the pace and length of the excursion no longer depend on the weakest member of the family: instead, all the passengers work together inseparably as a team and all share in the experience together. For a trip of several days the space above rear axle 9 can be equipped with a lockable storage container. A bicycle trailer can also be attached.

What is claimed is:

1. A frame structure for a double-axle polycycle, comprising a front axle and a rear axle having two adjacent substantially bowsaw-shaped curved pipes extending in a longitudinal direction of said double-axle polycycle and being inclined toward each other, said substantially bowsaw-shaped curved pipes contacting each other along a section of the structure of said curved pipes and on which said curved pipes, there are front seats, rear seats and respective backrests mounted, with ends of said substantially bowsaw-shaped curved pipes being connected with each other and thereby braced against each other via an additional set of pipes for absorbing acting tensile forces and deflecting forces due to the weight of the occupants seated on the structure of said curved pipes.

2. The frame structure for a double-axle polycycle according to claim 1, wherein the ends of a front pipe of said substantially bowsaw-shaped curved pipes join with said front axle and the ends of a rear pipe of said substantially bowsaw-shaped curved pipes join with said rear axle, with the ends of said front pipe and the ends of said rear pipe so joined are connected with each other and are thereby braced against each other with respect to traction via said front axle or said rear axle, which absorb the acting tensile forces of the deflected forces due to the weight of the occupants sitting on the structure of said curved pipes.

3. The frame structure for a double-axle polycycle according to claim 1, wherein the ends of a front pipe of said substantially bowsaw-shaped curved pipes and the ends of a rear pipe of said substantially bowsaw-shaped curved pipes each join with a further set of pipes running crosswise to the longitudinal direction of said double-axle polycycle, with said further set of pipes absorbing the acting tensile forces of the deflected forces due to the weight of the occupants sitting on the structure of said substantially bowsaw-shaped curved pipes.

4. The frame structure for a double-axle polycycle according to claim 1, wherein the ends of a front pipe of said substantially bowsaw-shaped curved pipes join with said front axle and the ends of a rear pipe of said substantially bowsaw-shaped curved pipes join with said rear axle, with a flat trapezium structure being constructed behind said front axle, with said front axle forming a longer trapezium side of said flat trapezium structure, and ends of a shorter trapezium side of said flat trapezium structure being connected with two straight, parallel pipes running to said rear axle with each of said two straight, parallel pipes being connected to said rear axle at a distance from its outer ends equal to approximately a quarter of the length of said rear axle.

5. The frame structure for a double-axle polycycle according to claim 1, wherein said two adjacent substantially bowsaw-shaped curved pipes are each straight along one section, and said substantially bowsaw-shaped curved pipes are connected to one another along said one section.

6. The frame structure for a double-axle polycycle according to claim 1, wherein one of said seats having a backrest is mounted on either side of said substantially bowsaw-shaped curved pipes, and said additional set of pipes running in the longitudinal direction under a respective pipe of said substantially bowsaw-shaped curved pipes is straight and has a bottom bracket bearing assigned to each seat located above it.

7. The frame structure for a double-axle polycycle according to claim 6, wherein said seats mounted on said substantially bowsaw-shaped curved pipes are supported on said additional set of pipes running in the longitudinal direction by struts.

8. The frame structure for a double-axle polycycle according to claim 1, wherein two of said seats having said respective backrests are mounted on either side of said substantially bowsaw-shaped curved pipes, and said additional set of pipes running in the longitudinal direction under a respective pipe of said substantially bowsaw-shape curved pipes is straight and has a bottom bracket bearing assigned to both said seats located above them.

9. The frame structure for a double-axle polycycle according to claim 8, wherein said seats mounted on said substantially bowsaw-shaped curved pipes are supported on said additional set of pipes running in the longitudinal direction by struts.

10. The frame structure for a double-axle polycycle according to claim 1, wherein the radius of curvature of said substantially bowsaw-shaped curved pipes is greater rearward than frontward, so that the position of said rear seats is higher than that of said front seats.

* * * * *